United States Patent
Matsuoka et al.

(10) Patent No.: US 7,963,551 B2
(45) Date of Patent: Jun. 21, 2011

(54) PILLAR TRIM FOR MOTOR VEHICLE

(75) Inventors: Daisuke Matsuoka, Hiroshima (JP);
Ikuko Onishi, Hiroshima (JP)

(73) Assignees: Daikyonishikawa Corporation (JP);
Mazda Motor Company (JP)

( * ) Notice: Subject to any disclaimer, the term of this patent is extended or adjusted under 35 U.S.C. 154(b) by 322 days.

(21) Appl. No.: 12/129,721

(22) Filed: May 30, 2008

(65) Prior Publication Data
US 2008/0296928 A1    Dec. 4, 2008

(30) Foreign Application Priority Data

| May 31, 2007 | (JP) | 2007-145815 |
| May 31, 2007 | (JP) | 2007-145816 |
| May 31, 2007 | (JP) | 2007-145891 |

(51) Int. Cl.
*B60R 21/16* (2006.01)
*B60J 7/00* (2006.01)
(52) U.S. Cl. ........... 280/730.2; 296/187.12; 296/193.06
(58) Field of Classification Search ............... 280/730.2, 280/738.3, 749, 728.2; 296/24.3, 191, 187.01, 296/187.05, 187.12, 193.06, 193.05, 39.3
See application file for complete search history.

(56) References Cited

U.S. PATENT DOCUMENTS
7,172,211 B2    2/2007 Hirose
2001/0052210 A1    12/2001 Mizutani et al.

FOREIGN PATENT DOCUMENTS
| EP | 1640222 A1 | 3/2006 |
| JP | 2002-059802 | 2/2002 |
| JP | 2002-59802 A | 2/2002 |
| JP | 2005-313674 | 11/2005 |
| JP | 2005-313674 A | 11/2005 |

OTHER PUBLICATIONS

Jonas Eriksson; "European Search Report"; EP 08009841; Nov. 18, 2008.

*Primary Examiner* — Eric Culbreth
(74) *Attorney, Agent, or Firm* — Studebaker & Brackett PC; Donald R. Studebaker

(57) ABSTRACT

A pillar trim on the vehicle-interior side of a pillar includes a pillar trim body located below an airbag and connected at its upper end part to the lower end of a top sealing member. A plurality of guide platforms are raised from the upper end part of the pillar trim body at spaced intervals in the vehicle front-to-rear direction to guide the inflation of the airbag towards the vehicle interior. The basal ends of each adjacent guide platforms are joined by a connecting part between the adjacent guide platforms. A groove for receiving the lower end of the top sealing member is formed between the vehicle-interior sides of the guide platforms and the pillar trim body. A through hole is vertically formed at least between the connecting part and the pillar trim body to open into the groove.

7 Claims, 8 Drawing Sheets

PILLAR TRIM FOR MOTOR VEHICLE

CROSS-REFERENCES TO RELATED APPLICATIONS

This application claims priority under 35 USC 119 to Japanese Patent Applications Nos. 2007-145815, 2007-145816 and 2007-145891 all filed on May 31, 2007, the entire contents of all of which are incorporated herein by reference.

BACKGROUND OF THE INVENTION (a) Field of the Invention

This invention relates to pillar trims for motor vehicles fitted with airbags as safety measures in case of side collisions.

(b) Description of the Related Art

Various airbag systems for protecting motor vehicle passengers' heads in case of a side collision have been conventionally known. Among such airbag systems are known those in which an airbag is placed on the vehicle interior side of the side body of a motor vehicle and towards the roof to extend in a front-to-rear direction of the vehicle body from a front pillar (hereinafter, referred to as an A-pillar) through a center pillar (hereinafter, referred to as a B-pillar) to the vicinity of a rear pillar (hereinafter, referred to as a C-pillar), as disclosed, for example, in Published Japanese Patent Application No. 2002-59802 and Published Japanese Patent No. 3866733. In these known airbag systems, the airbag is contained between a pillar inner panel and a top sealing member so as to be covered from the vehicle interior side with the top sealing member.

In the above known airbag systems, a plurality of guide platforms are disposed, at an upper end part of a pillar trim body covering the interior side of each pillar, at spaced intervals in the front-to-rear direction of the vehicle body to rise up beyond the upper end of the pillar trim body. Each guide platform has a guide surface for guiding the inflation of the airbag towards the vehicle interior. The airbag is placed in a folded state on top of the guide platforms. The lower end of the top sealing member is connected to the upper end part of the pillar trim body. Upon inflation of the airbag, the airbag pushes open a lower part of the top sealing member towards the vehicle interior and is guided by the guide surfaces of the guide platforms to inflate towards the vehicle interior.

In the airbag system disclosed in Published Japanese Patent No. 3866733, the pillar trim body has bosses formed below the guide platform to rise towards the pillar of the vehicle body. The pillar trim body is fitted to the pillar by engaging clips at the distal ends of the bosses into clip holes formed in the pillar.

The guide platforms receive a reaction force upon inflation of the airbag. Therefore, to withstand the reaction force, the upper end part of the pillar trim body is generally given a high rigidity.

However, if the upper end part of the pillar trim body has a high rigidity, this causes a problem in safety that in case where the passenger's head hits the upper end part of the pillar trim body in a side collision, the passenger might be seriously damaged.

If each boss includes a clip as in Published Japanese Patent No. 3866733, upon action of a reaction force due to inflation of the airbag on the guide platforms, a force is transmitted from the pillar trim body to the boss located below the guide platforms. This might cause breakage of the boss from its basal end close to the pillar trim body.

Alternatively, unlike with the airbag system in which the boss includes a clip as in Published Japanese Patent No. 3866733, a technique is known in which the pillar trim body has a positioning pin formed below the guide platforms to rise therefrom for the purpose of positioning the pillar trim body in fitting it to the pillar. Also in this case, the positioning pin might break likewise upon inflation of the airbag.

Furthermore, in the structure in which a plurality of guide platforms are disposed at spaced intervals as in the above known airbag systems, the inflating airbag cannot be supported between the guide platforms. Therefore, its reaction force is concentrated on the guide platforms, which might break the guide platforms.

A first object of the present invention is to provide a motor vehicle pillar trim ensuring, in case of a side collision, an appropriate rigidity that can withstand a reaction force due to inflation of the airbag and passengers' safety.

A second object of the present invention is to prevent a positioning pin of a pillar trim body from breaking upon inflation of an airbag.

A third object of the present invention is to prevent guide platforms from being broken by a reaction force upon inflation of an airbag.

SUMMARY OF THE INVENTION

To attain the first object of the invention, an aspect of the invention is directed to a motor vehicle pillar trim fitted with an airbag that is placed on the interior side of a vehicle body towards the roof to extend in a front-to-rear direction of the vehicle body and covered with a top sealing member from the vehicle interior side.

The pillar trim includes a pillar trim body located below the held airbag, connected at an upper end part thereof to the lower end of the top sealing member and covering the vehicle interior-side surface of a pillar of the vehicle body. The pillar trim further includes a plurality of guide platforms disposed at the upper end part of the pillar trim body at spaced intervals in the front-to-rear direction of the vehicle body to rise up beyond the upper end of the pillar trim body and having their respective guide surfaces for guiding the inflation of the airbag towards the vehicle interior. The pillar trim still further includes a connecting part joining the basal ends of each adjacent pair of the plurality of guide platforms to each other in the front-to-rear direction of the vehicle body. Furthermore, a groove is formed between the vehicle interior-side surfaces of the guide platforms and the upper end part of the pillar trim body to receive the lower end of the top sealing member. Furthermore, a through hole is vertically formed at least between the connecting part and the pillar trim body to open into the groove.

With the above configuration, since each adjacent pair of guide platforms raised upward beyond the upper end of the pillar trim body are joined to each other by a connecting part, that region of the pillar trim body around the guide platforms has a high rigidity. Therefore, the upper end part of the pillar trim body can well withstand the reaction force upon inflation of the airbag.

Furthermore, the pillar trim body is separated from at least the connecting part joining each adjacent pair of guide platforms by the through hole formed between them but joined on both sides of the through hole to the adjacent pair of guide platforms by the bottom wall of the groove. Therefore, the rigidity of the upper end part of the pillar trim body is appropriately reduced, which reduces the impact on the passenger's head (head impact) in a side collision.

An insertion part may be integrally formed with the connecting part between each adjacent pair of the plurality of guide platforms to extend towards the vehicle exterior from the connecting part and then rise up and configured to be insertable into an insertion opening formed in the pillar of the vehicle body.

In this case, the insertion part formed at the connecting part increases the rigidity of the connecting part and may accordingly increase the head impact. However, since the through hole is formed between the connecting part formed with the insertion part and the pillar trim body, the head impact can be reduced.

To attain the second object of the invention, another aspect of the invention is directed to a motor vehicle pillar trim fitted with an airbag that is placed on the interior side of a vehicle body towards the roof to extend in a front-to-rear direction of the vehicle body and covered with a top sealing member from the vehicle interior side.

The pillar trim includes a pillar trim body located below the airbag, connected at an upper end part thereof to the lower end of the top sealing member and covering the vehicle interior-side surface of a pillar of the vehicle body. The pillar trim further includes a plurality of guide platforms disposed at the upper end part of the pillar trim body at spaced intervals in the front-to-rear direction of the vehicle body to rise up beyond the upper end of the pillar trim body and having their respective guide surfaces for guiding the inflation of the airbag towards the vehicle interior. The pillar trim still further includes a plate-shaped connecting part joining the basal ends of each adjacent pair of the plurality of guide platforms to each other in the front-to-rear direction of the vehicle body. The pillar trim still further includes an insertion part rising up from the vehicle exterior side of the connecting part and insertable into an insertion opening formed in the pillar of the vehicle body. The pillar trim still further includes an extension extending downward from the connecting part while being spaced apart from the pillar trim body towards the vehicle exterior. The pillar trim still further includes a positioning pin raised from the distal end of the extension towards the vehicle exterior and fittable into a positioning hole formed in the pillar. The pillar trim still further includes a reinforcing rib integrally formed on the vehicle exterior-side surface of the extension to join the bottom surface of the connecting part to the positioning pin.

With the above configuration, a reinforcing rib is integrally formed on the vehicle exterior-side surface of the extension and joins the connecting part to the positioning pin. Therefore, the positioning pin raised from the extension is firmly joined to the extension, which prevents breakage of the positioning pin even if a reaction force upon inflation of the airbag is transmitted from the connecting pin and the extension to the positioning pin.

Furthermore, since the positioning pin is formed close to the upper end part of the pillar trim body to which the lower end of the top sealing member will be connected, this enhances the accuracy of assembly of the pillar trim into the pillar of the vehicle body. Therefore, when the lower end of the top sealing member is connected to the upper end part of the pillar trim body, the gap at the connection point can be eliminated, thereby improving the appearance.

The extension may have integral side walls formed on both sides in the front-to-rear direction of the vehicle body to join the extension to the pillar trim body and thereby have a general shape of a bridge.

With the above configuration, since the extension is formed in the shape of a bridge and integrally joined to the pillar trim body, this increases the rigidity of the extension. Therefore, breakage of the positioning pin can be more effectively prevented.

To attain the third object of the invention, still another aspect of the invention is directed to a motor vehicle pillar trim fitted with an airbag that is placed on the interior side of a vehicle body towards the roof to extend in a front-to-rear direction of the vehicle body and covered with a top sealing member from the vehicle interior side.

The pillar trim includes a pillar trim body located below the airbag, connected at an upper end part thereof to the lower end of the top sealing member and covering the vehicle interior-side surface of a pillar of the vehicle body. The pillar trim further includes a plurality of guide platforms disposed at the upper end part of the pillar trim body at spaced intervals in the front-to-rear direction of the vehicle body to rise up beyond the upper end of the pillar trim body and having their respective guide surfaces for guiding the inflation of the airbag towards the vehicle interior. The pillar trim still further includes a connecting part joining the basal ends of each adjacent pair of the plurality of guide platforms to each other in the front-to-rear direction of the vehicle body. Furthermore, a groove is formed between the vehicle interior-side surfaces of the guide platforms and the upper end part of the pillar trim body to receive the lower end of the top sealing member. Furthermore, a plate-shaped rib is integrally raised from the connecting part between each adjacent pair of the plurality of guide platforms. The upper edge of the plate-shaped rib is substantially flush with the guide platforms and the distance between the plate-shaped rib and the upper end part of the pillar trim body is substantially the same as the width of the groove along the vehicle width direction.

With the above configuration, the plate-shaped rib raised from the connecting part between each adjacent pair of guide platforms increases the rigidity of the connecting part, thereby firmly supporting the inflating airbag. Furthermore, since the plate-shaped rib is formed on the connecting part between each adjacent pair of guide platforms, the inflating airbag can be supported not only by the guide platforms but also by the plate-shaped rib. Therefore, the reaction force upon inflation of the airbag is distributed also to the plate-shaped rib, whereby stress concentration on the guide platforms can be reduced to prevent breakage of the guide platforms.

Furthermore, since the upper edge of the plate-shaped rib is substantially flush with the guide platforms, the inflating airbag reaches the top surfaces of the guide platforms and the upper edge of the plate-shaped rib substantially at the same time. Thus, the reaction force can be evenly distributed to the guide platforms and the plate-shaped rib to prevent breakage of the guide platforms with further stability and reliability.

Furthermore, since the plate-shaped rib does not extend towards the groove, the top sealing member can be smoothly inserted into the groove without interfering with the plate-shaped rib.

The plate-shaped rib preferably comprises at least one of a first rib extending substantially in the front-to-rear direction of the vehicle body and a second rib extending substantially in the vehicle width direction.

With the above configuration, specifically, the plate-shaped rib comprises either one of the first and second ribs or both of the first and second ribs having different orientations. Thus, the above-stated effects of the plate-shaped rib can be more certainly obtained.

Both side edges of the first rib in the front-to-rear direction of the vehicle body may be integrally joined to the adjacent guide platforms.

With the above configuration, since the first rib is integrally joined to the adjacent pair of guide platforms, this increases the rigidities of the connecting part and the adjacent pair of guide platforms. In addition, the integral joinder of the first rib and the adjacent guide platforms increases the area over which the pressure from the inflating airbag is received, whereby the airbag can easily and stably strike the guide platforms and the plate-shaped rib. Therefore, the concentration of reaction force on the guide platforms upon inflation of the airbag can certainly be reduced to prevent breakage of the guide platforms.

A clearance may be left between each of the side edges of the first rib in the front-to-rear direction of the vehicle body and the guide platform adjacent to the side edge of the first rib.

With the above configuration, the clearance between the first rib and each of the adjacent guide platforms appropriately reduces the rigidity of the upper end part of the pillar trim body, whereby the impact on the passenger's head in a side collision can be reduced.

When the first rib and the adjacent guide platforms are integrally joined as stated previously, if the inflating airbag unevenly strikes the guide platforms, the guide platforms or their surrounding regions might be broken. According to the above configuration, however, the clearance formed between the first rib and each of the adjacent guide platforms makes the guide platforms more likely to flex, thereby stably preventing breakage of the guide platforms.

Preferably, the pillar trim further includes an insertion part rising up from the vehicle exterior side of the connecting part and insertable into an insertion opening formed in the pillar of the vehicle body and a clearance at least corresponding to the thickness of the peripheral edge of the insertion opening in the pillar is left between the insertion part and the plate-shaped rib.

With the above configuration, a clearance into which the peripheral edge of the insertion opening in the pillar of the vehicle body can be inserted is left between the insertion part and the plate-shaped rib so that when the insertion part is inserted into the insertion opening, the plate-shaped rib does not interfere with the pillar. Thus, the pillar trim can be smoothly fitted to the pillar of the vehicle body without the plate-shaped rib interfering with the pillar.

DETAILED DESCRIPTION OF THE INVENTION

Embodiments of the present invention will be described below with reference to the drawings.

Embodiment 1

Figure 1:
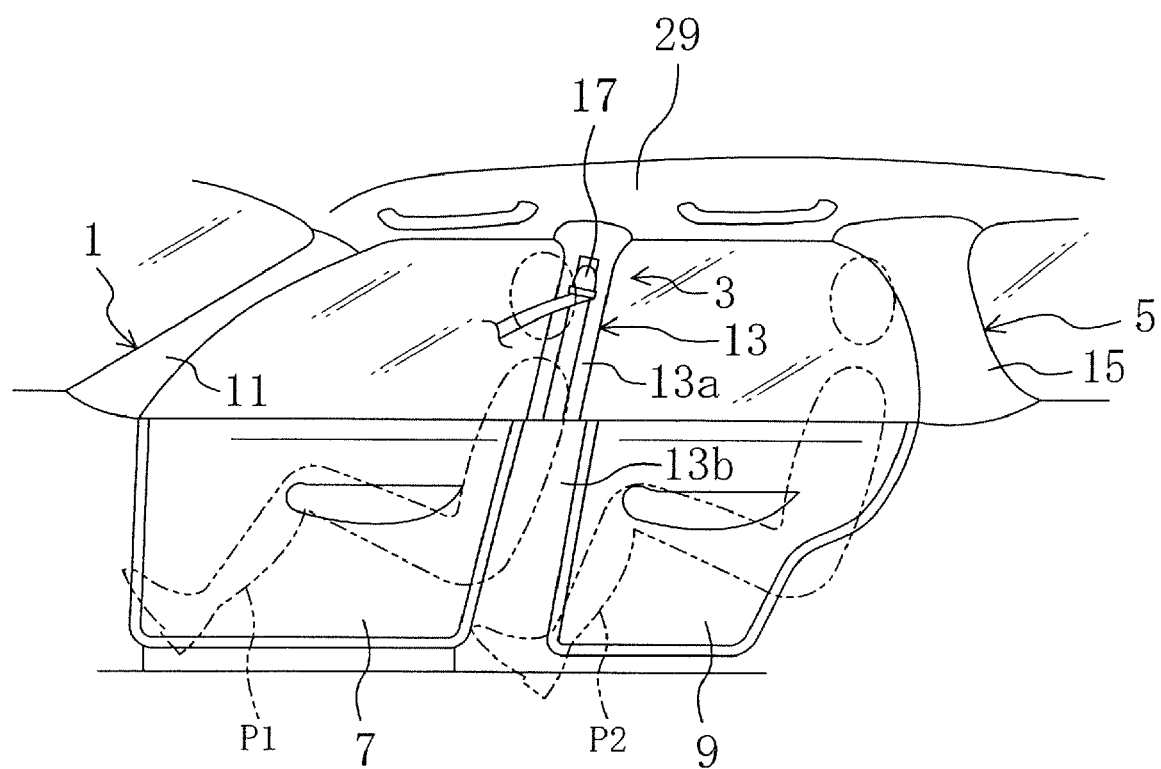
FIG. 1 is a right side view of the passenger compartment of a motor vehicle including pillar trims according to Embodiment 1 of the present invention when viewed from the left.

FIG. 1 is a view showing the right side surface of the passenger compartment of a motor vehicle including pillar trims according to Embodiment 1 of the present invention. In the figure, P1 shown in the imaginary lines indicates a front passenger sitting on an unshown front seat and P2 likewise indicates a rear passenger sitting on an unshown rear seat. The side body of the motor vehicle includes vertically extending A-pillar 1, B-pillar 3 and C-pillar 5 arranged in order from the vehicle front. A front door 7 is placed between the A-pillar 1 and the B-pillar 3. Furthermore, a rear door 9 is placed between the B-pillar 3 and the C-pillar 5. The vehicle interior sides of the pillars 1, 3 and 5, are provided with resin-made A-pillar trim 11, B-pillar trim 13 and C-pillar trim 15, respectively. The B-pillar trim 13 is composed of an upper pillar trim 13a and a lower pillar trim 13b. Placed in an upper part of the upper pillar trim 13a is a seatbelt shoulder anchor 17 for a front seat. The seatbelt shoulder anchor 17 can be adjusted in height according to the body type of the front passenger P1.

Figure 2:
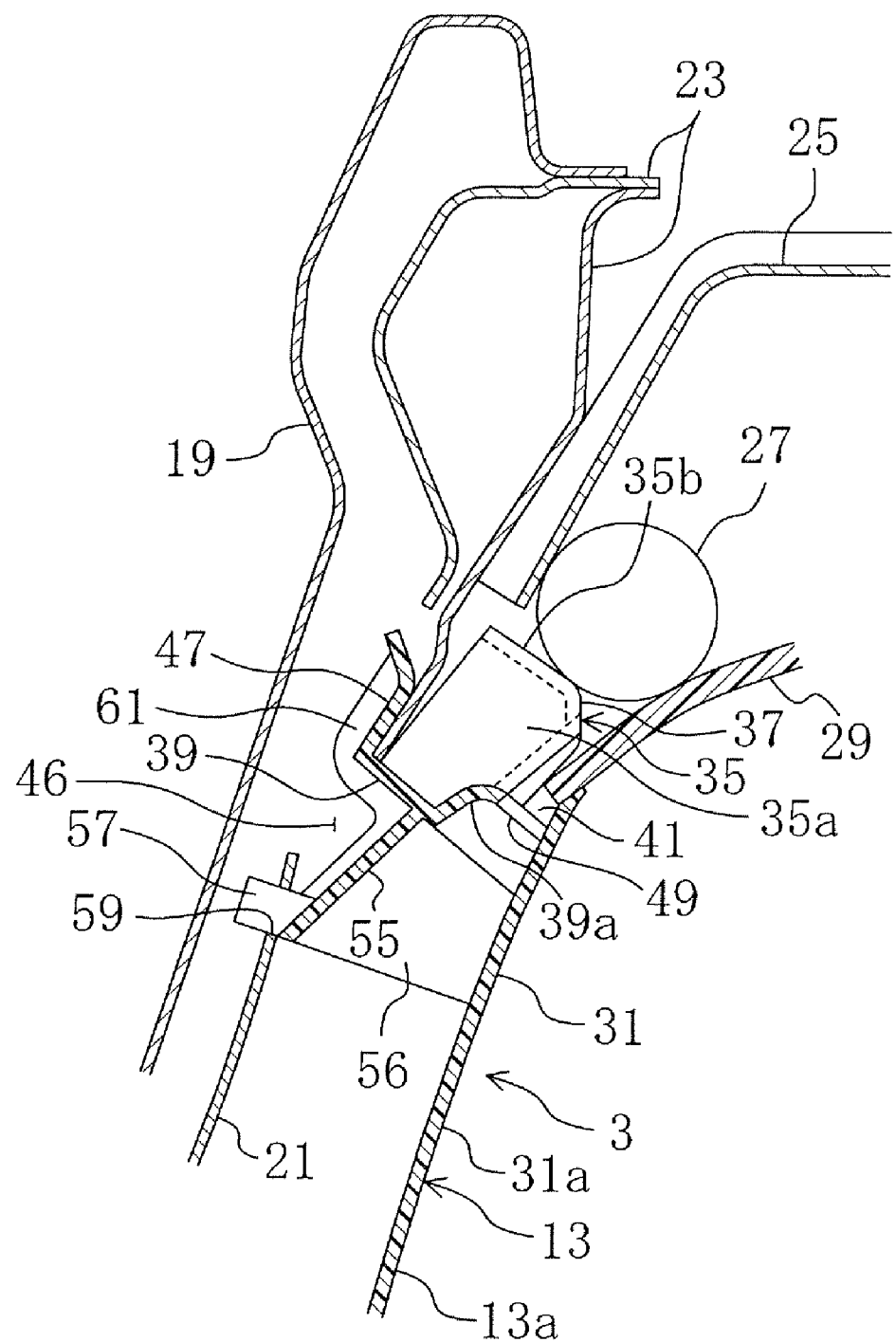
FIG. 2 is a cross-sectional view taken along the line II-II of FIG. 4 and showing the state where an upper pillar trim is fitted to a vehicle body.

FIG. 2 shows an upper part of the B-pillar 3 (B-pillar trim 13). In this figure, reference numeral 19 denotes an outer panel of the vehicle body and reference numeral 21 denotes an inner panel thereof joined to the vehicle interior side of the outer panel 19. A roof side rail 23 is secured to the vehicle interior side of an upper part of the outer panel 19. A roof side rail junction 25 is secured to the vehicle interior side of the roof side rail 23. Furthermore, on the vehicle interior side of the roof side rail junction 25, an airbag 27 of an airbag system for protecting passengers' heads in case of a side collision is placed to extend in the vehicle front-to-rear direction from the A-pillar 1 through the B-pillar 3 to the vicinity of the C-pillar 5. The airbag 27 is contained in a folded state between the roof side rail junction 25 and a top sealing member 29 covering the vehicle interior side of both of the roof side rail junction 25 and a roof panel (not shown).

Figure 3:
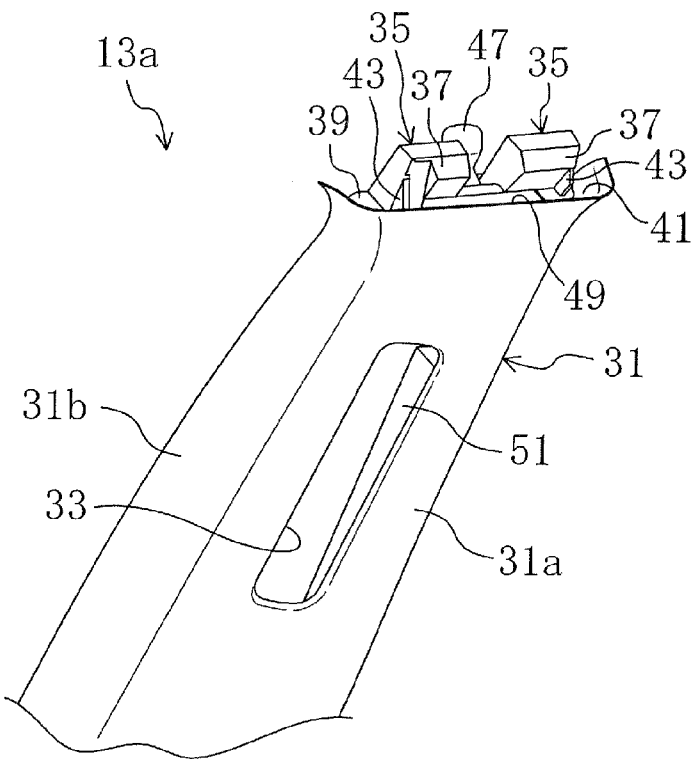
FIG. 3 is a perspective view of the upper pillar trim when viewed from the vehicle interior.
Figure 4:
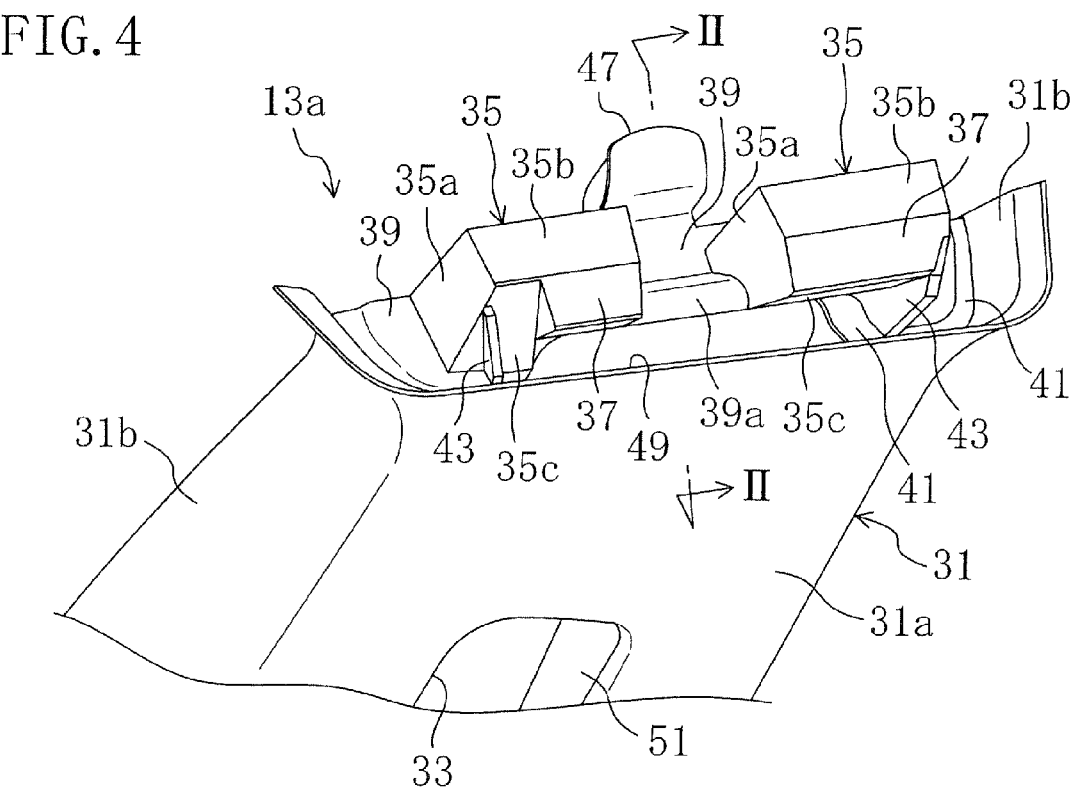
FIG. 4 is an enlarged perspective view showing an upper part of the upper pillar trim of FIG. 3.
Figure 5:
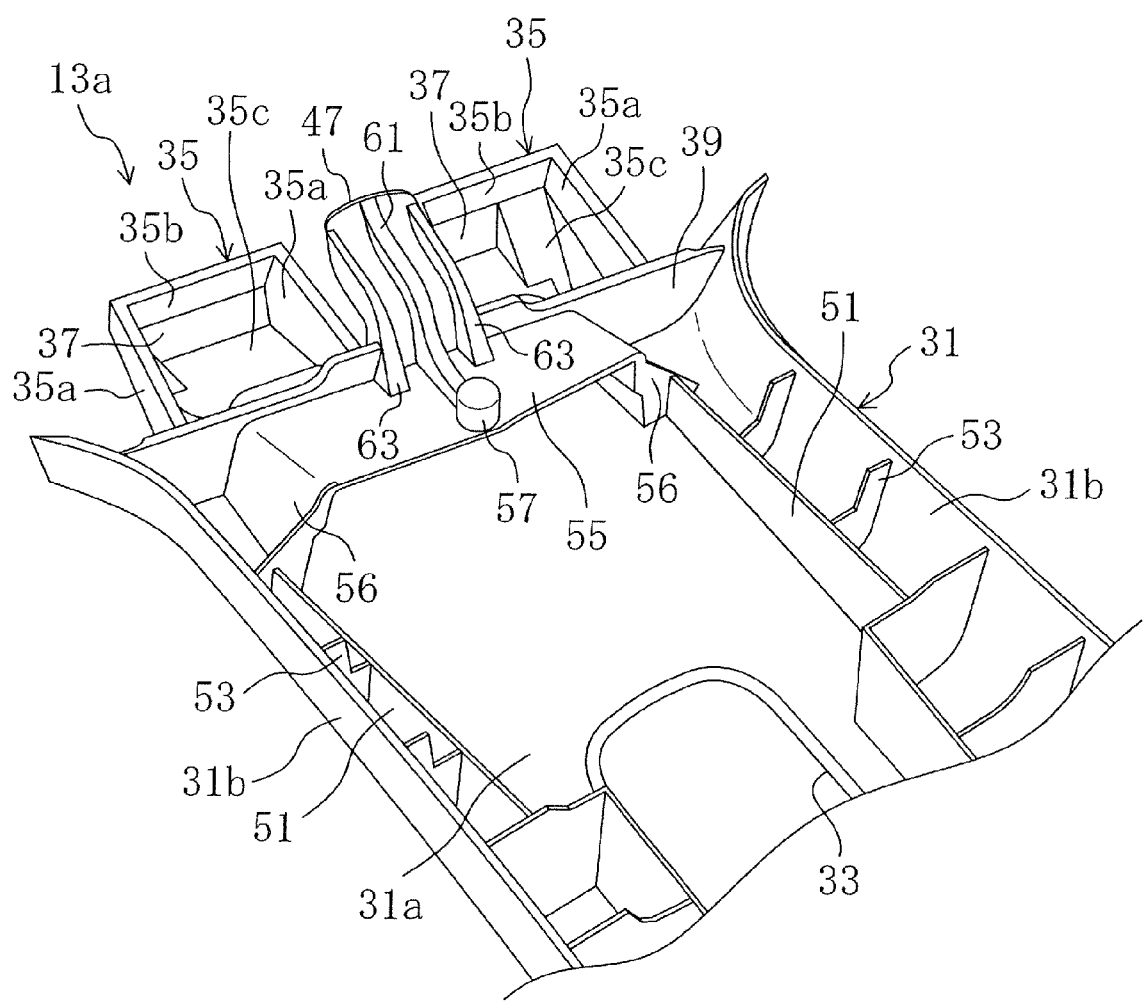
FIG. 5 is an enlarged perspective view showing the upper part of the upper pillar trim when viewed from the vehicle exterior (from the back).
Figure 6:
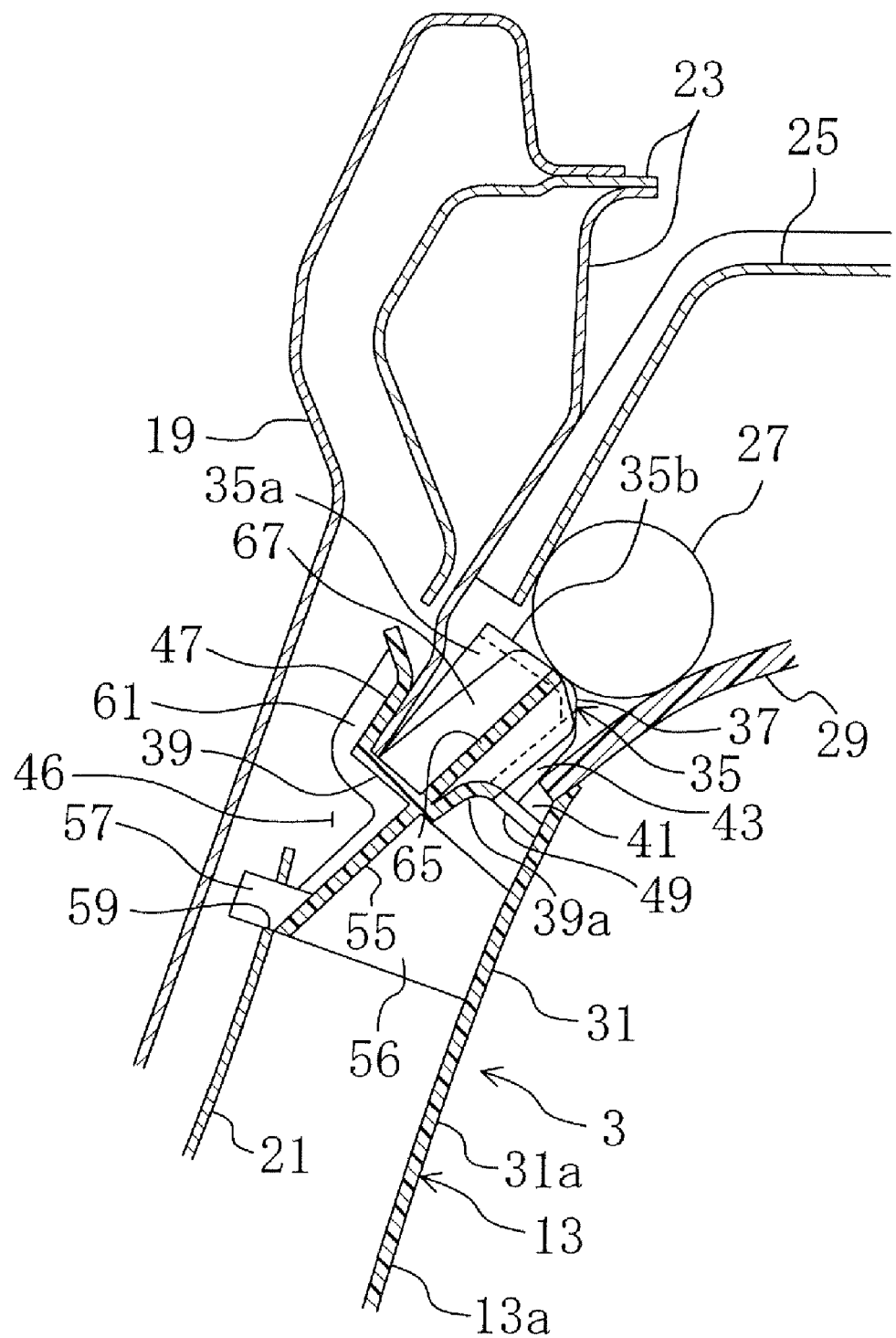
FIG. 6 is a cross-sectional view taken along the line VI-VI of FIG. 8 and showing the state where an upper pillar trim according to Embodiment 2 of the present invention is fitted to a vehicle body.
Figure 7:
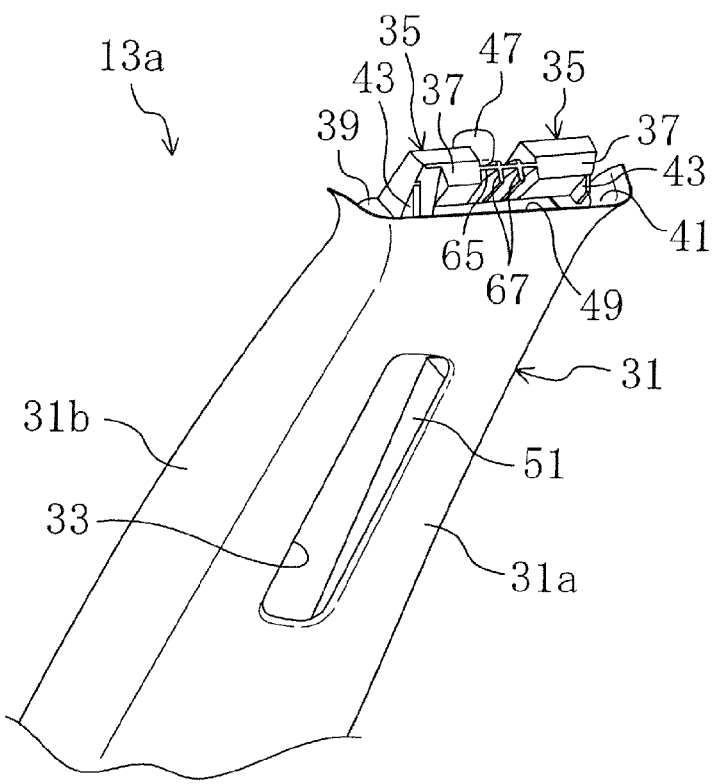
FIG. 7 is a perspective view of the upper pillar trim when viewed from the vehicle interior.
Figure 8:
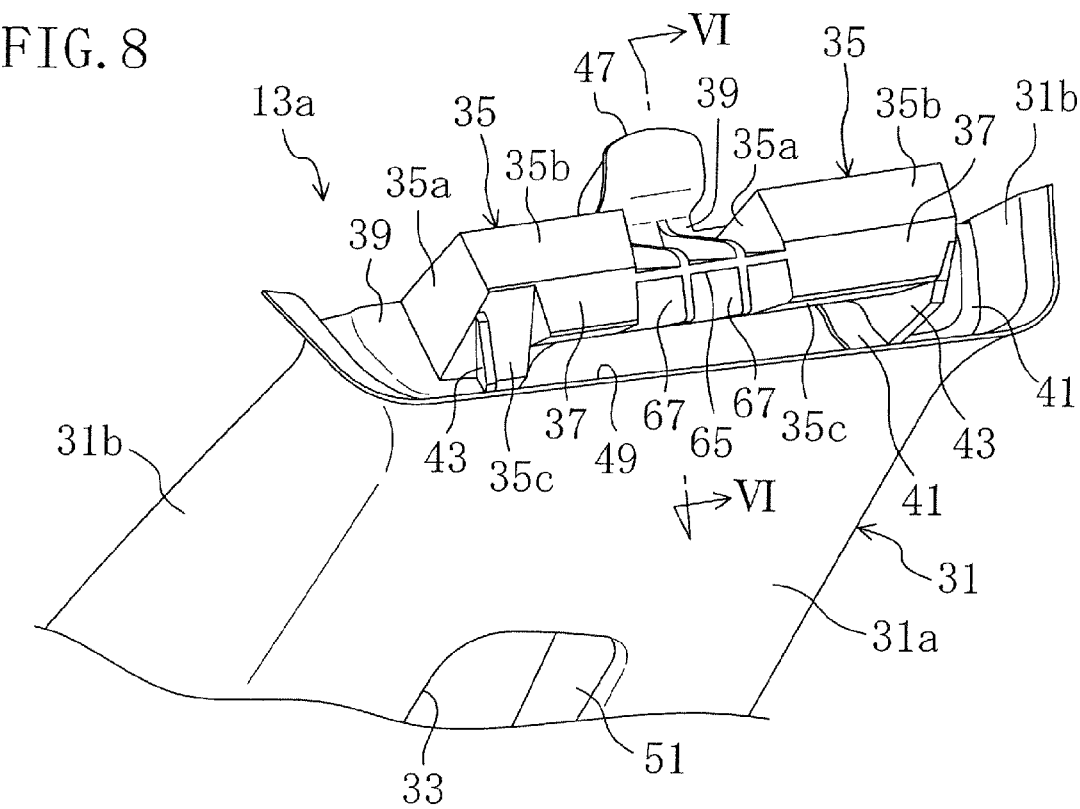
FIG. 8 is an enlarged perspective view showing an upper part of the upper pillar trim of FIG. 7.
Figure 9:
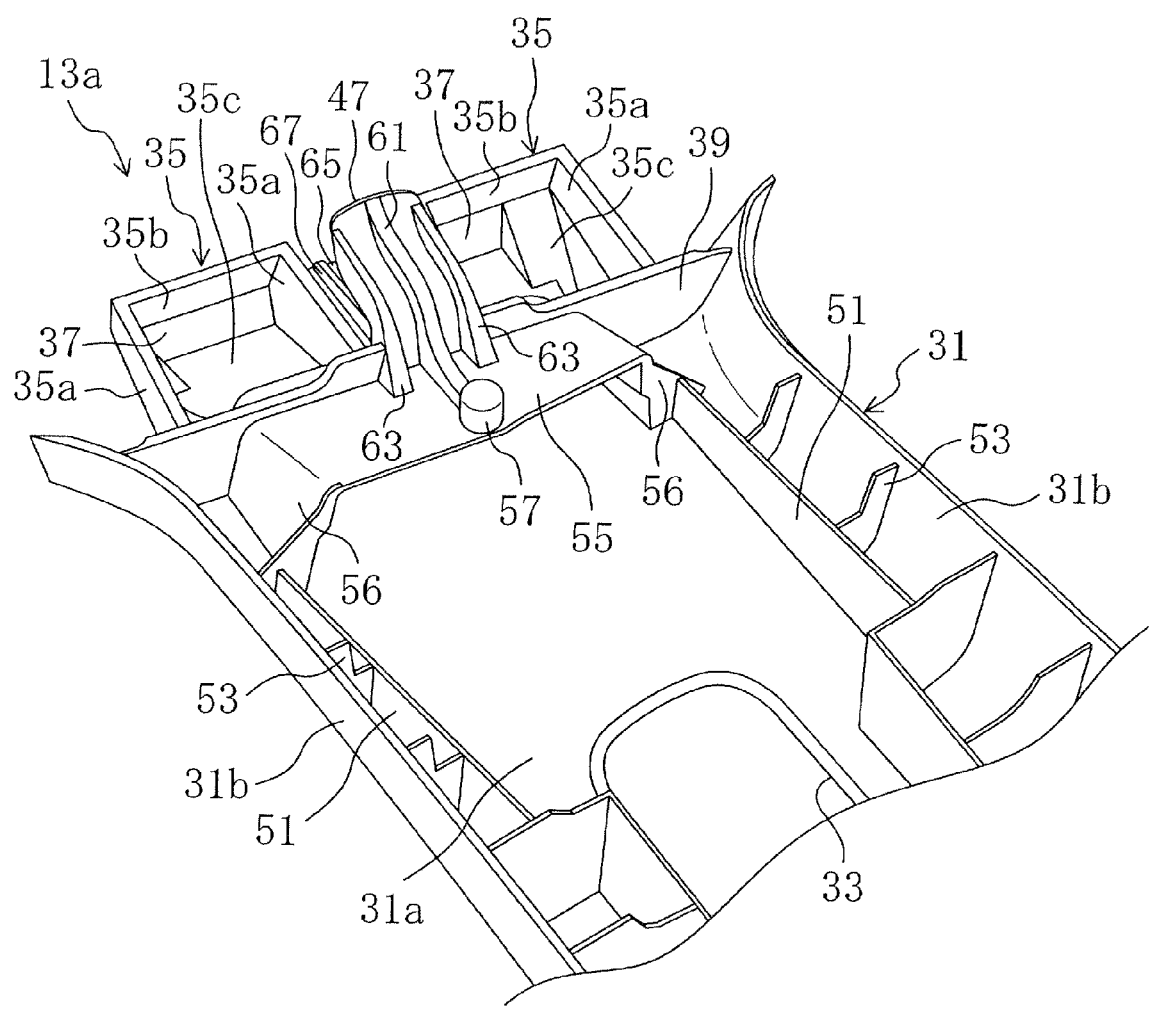
FIG. 9 is an enlarged perspective view showing the upper part of the upper pillar trim when viewed from the vehicle exterior (from the back).

The upper pillar trim 13a of the B-pillar trim 13 is located below the airbag 27. The upper pillar trim 13a includes a pillar trim body 31 covering the vehicle interior-side surface of the pillar (composed of the outer panel 19 and the inner panel 21) of the vehicle body. As shown in FIGS. 3, 4 and 5, the pillar trim body 31 includes a front part 31a facing the vehicle interior and right and left side parts 31b and 31b and is thereby formed in a substantially U-shaped cross section. Formed in a midportion of the front part 31a is a slot 33 supporting height adjustment of the seatbelt shoulder anchor 17.

On the vehicle exterior side (the back) of an upper end part of the pillar trim body 31, a plate-shaped part 39 serving as a connecting part is integrally formed with the pillar trim body 31 to join the front part 31a and both the side parts 31b and 31b. The plate-shaped part 39, as shown in FIG. 2, inclines upwardly towards the vehicle exterior with respect to the pillar trim body 31. Two guide platforms 35 and 35 are raised upward from the plate-shaped part 39 at a distance between them in the vehicle front-to-rear direction. The airbag 27 is placed above these guide platforms 35 and 35. Each guide platform 35 includes side walls 35a and 35a on both sides thereof in the vehicle front-to-rear direction, a top wall 35b integrally joining vehicle exterior-side portions of the upper edges of both the side walls 35a and 35a, and a front wall 35c integrally joining the vehicle interior-side edges of both the side walls 35a and 35a and the top wall 35b. Each guide platform 35 is formed in the shape of a box opening at the vehicle exterior side by the above walls and the plate-shaped part 39. The basal end (bottom end) of the front wall 35c is integrally joined to the plate-shaped part 39. The top wall 35b of each guide platform 35 is integrally formed with a guide surface 37 continuous with the vehicle interior-side edge of the top wall 35b. The guide surface 37 is configured to guide the inflation of the airbag 27 towards the vehicle interior. The guide surface 37 inclines downward from the top wall 35b towards the vehicle interior. The basal ends (bottom ends) of the opposed side walls 35a and 35a of the two guide platforms 35 and 35 are joined to each other in the vehicle front-to-rear direction by the plate-shaped part 39.

A groove 41 is formed between the vehicle interior-side surfaces of the guide platforms 35 and 35 and the pillar trim body 31. As shown in FIG. 2, the lower end of the top sealing member 29 is inserted in the groove 41 and thereby connected in engagement with the upper end part of the pillar trim body 31. A part of the plate-shaped part 39 between each guide platform 35 and the pillar trim body 31 constitutes a part of the bottom wall of the groove 41.

The front walls 35c and 35c of the guide platforms 35 and 35 have their respective vertically extending ribs 43 and 43 raised therefrom towards the vehicle interior. The lower end of the top sealing member 29 inserted in the groove 41 is wedged between the ribs 43 and 43 and the front part 31a of the pillar trim body 31. Upon inflation, the airbag 27 develops below from its folded state, is then guided by the guide surfaces 37 and 37 of the guide platforms 35 and 35 to disengage the lower end of the top sealing member 29 from the groove 41 and then inflates towards the vehicle interior while pushing open the lower end of the top sealing member 29 towards the vehicle interior.

An upwardly raised portion 39a is formed on the plate-shaped part 39 between the opposed side walls 35a and 35a of both the guide platforms 35 and 35.

As shown in FIG. 2, an insertion opening 46 is formed in a part of the vehicle body located between the lower end of the roof side rail 23 and the upper end of the inner panel 21 and corresponding to the B-pillar 3 (the pillar of the vehicle body).

A plate-shaped insertion part 47 is integrally formed with a portion of the plate-shaped part 39 between both the guide platforms 35 and 35 to rise up from the vehicle exterior side of the portion thereof and then bend its top end towards the vehicle exterior. The insertion part 47 is inserted in the insertion opening 46. The lower end of the roof side rail 23 is wedged between the vehicle interior-side surface of the insertion part 47 and the vehicle exterior-side surfaces of both the guide platforms 35 and 35 and, in this state, the upper pillar trim 13a is fitted to the vehicle body. The upper pillar trim 13a is fixed, at a fixing part (not shown) provided in a lower part thereof, to a part of the inner panel 21 corresponding to the B-pillar 3.

A through hole 49 is formed between the plate-shaped part 39 and the upper end part of the pillar trim body 31 to vertically pass through the bottom of the groove 41 and open into the groove 41. Specifically, the through hole 49 opens at the plate-shaped part 39 (the bottom of the groove 41) over a region extending between substantially the midpoints of the guide platforms 35 and 35 in the vehicle front-to-rear direction with respect to the raised portion 39a to separate the plate-shaped part 39 from the pillar trim body 31. Thus, both the guide platforms 35 and 35 and the pillar trim body 31 are integrally joined by portions of the plate-shaped part 39 on both sides of the through hole 49 in the vehicle front-to-rear direction and portions of the plate-shaped part 39 adjoining both the side parts 31b and 31b of the pillar trim body 31.

On the back of the upper pillar trim 13a (on the surface thereof shown in FIG. 5), a pair of vertical walls 51 and 51 are raised at both ends of the front part 31a in the vehicle front-to-rear direction. Each vertical wall 51 and the associated side part 31b are integrally joined to each other by a plurality of first reinforcing ribs 53 arranged at vertically spaced intervals.

A plate-shaped extension 55 is extended downward from the bottom surface of the plate-shaped part 39. The upper edge of the extension 55 is integrally joined to the plate-shaped part 39. The extension 55 extends substantially vertically to the plate-shaped part 39 while being spaced apart from the pillar trim body 31 towards the vehicle exterior. As shown in FIG. 5, the extension 55 has integral side walls 56 and 56 formed on both sides in the vehicle front-to-rear direction to join at their vehicle interior side edges to the front part 31a of the pillar trim body 31. Thus, the extension 55 is formed in the shape of a bridge.

A columnar positioning pin 57 is raised towards the vehicle exterior from the distal end (lower end) of the middle of the extension 55 in the vehicle front-to-rear direction. On the other hand, as shown in FIG. 2, the upper part of the inner panel 21 has a positioning hole 59 formed to pass therethrough in the vehicle width direction and correspond to the positioning pin 57. The upper part of the pillar trim body 31 is positioned to the inner panel 21 by inserting the positioning pin 57 into the positioning hole 59.

Furthermore, a vertically extending second reinforcing rib 61 is integrally formed on the vehicle exterior-side surfaces of the extension 55 and the insertion part 47 and the bottom surface of the plate-shaped part 39 to join the distal end (upper end) of the insertion part 47 to the positioning pin 57. Specifically, the second reinforcing rib 61 is integrally formed on the back surface (vehicle exterior-side surface) of the insertion part 47, the bottom surface of the plate-shaped part 39 and the vehicle exterior-side surface of the extension 55 to vertically continuously extend along substantially the vertical center line of the insertion part 47. The lower end of the second reinforcing rib 61 is integrally joined to the positioning pin 57.

Furthermore, two third reinforcing ribs 63 and 63 are integrally formed on the insertion part 47, the plate-shaped part 39 and the extension 55 on both sides of the second reinforcing rib 61 in the vehicle front-to-rear direction to rise towards the vehicle exterior. The two third reinforcing ribs 63 and 63 are formed one at each end of the back surface of the insertion part 47 in the vehicle front-to-rear direction and their lower ends continuously extend to the upper end of the vehicle exterior-side surface of the extension 55.

Effects of Embodiment 1

In the B-pillar trim 13 for a motor vehicle according to Embodiment 1, two guide platforms 35 and 35 rising up beyond the upper end of the pillar trim body 31 of the upper pillar trim 13a are joined to each other by the portion of the plate-shaped part 39 serving as a connecting part. Therefore, the upper region of the pillar trim body 31 is increased in rigidity and can thereby well withstand the reaction force upon inflation of the airbag 27.

Furthermore, a through hole 49 is formed so as to be surrounded by the portion of the plate-shaped part 39 joining both the basal ends of the guide platforms 35 and 35, portions of both the guide platforms 35 and 35 and the vehicle interior-side surface of the front part 31a of the pillar trim body 31 to vertically pass through the groove 41, whereby the pillar trim body 31 is separated from the portion of the plate-shaped part 39 located between both the guide platforms 35 and 35 and the portions of both the guide platforms 35 and 35. Therefore, the rigidity of the upper end part of the pillar trim body 31 is appropriately reduced, which effectively reduces the impact on the passenger's head (head impact) in a side collision. As a result of theses effects, the B-pillar trim 13 ensures, in case of a side collision, an appropriate rigidity withstandable against a reaction force due to inflation of the airbag 27 and passengers' safety.

Since the insertion part 47 is formed at the portion of the plate-shaped part 39 located between both the guide platforms 35 and 35, this increases the rigidity of the plate-shaped part 39 and may accordingly increase the head impact. However, since in this embodiment the through hole 49 is formed between the portion of the plate-shaped part 39 formed with the insertion part 47 and the pillar trim body 31, the increase in head impact is reduced.

Furthermore, in the B-pillar trim 13 for a motor vehicle according to this embodiment, a second reinforcing rib 61 is integrally formed on the bottom surface of the plate-shaped part 39 (connecting part) and the vehicle exterior-side surface of the extension 55 and joined to the positioning pin 57. This configuration increases the rigidity of the positioning pin 57. As a result, even if a reaction force upon inflation of the airbag 27 is transmitted from the plate-shaped part 39 and the extension 55 to the positioning pin 57, the positioning pin 57 can be prevented from being broken.

Furthermore, since the second reinforcing rib 61 is formed to join the insertion part 47 to the positioning pin 57, the insertion part 47 is also increased in rigidity and, therefore, can be prevented from being broken.

In addition, two third reinforcing ribs 63 and 63 are formed on the insertion part 47 to both sides of the second reinforcing rib 61 to extend to the extension 55. Therefore, the insertion part 47 is further increased in rigidity and, therefore, can be more effectively prevented from being broken.

Furthermore, the extension 55 is formed in the shape of a bridge and joined to the pillar trim body 31. Therefore, the rigidity of the extension 55 is increased, which more effectively prevents breakage of the positioning pin 57.

Furthermore, the positioning pin 57 is formed close to the upper end part of the pillar trim body 31 to which the lower end of the top sealing member 29 will be connected. This enhances the accuracy of assembly of the upper pillar trim 13a into the B-pillar 3 of the vehicle body. As a result, when the lower end of the top sealing member 29 is connected to the upper end part of the pillar trim body 31, the gap at the connection point can be eliminated, thereby improving the appearance.

Embodiment 2

FIGS. 6 to 9 show Embodiment 2 of the present invention. Like parts as in FIGS. 1 to 5 are identified by like reference numerals and a detailed description thereof is not given below.

In this embodiment, the portion of the plate-shaped part 39 between both the guide platforms 35 and 35 disposed at the upper end part of the pillar trim body 31 has a plate-shaped first rib 65 and two plate-shaped second ribs 67 and 67 raised therefrom to extend from and substantially vertically to the plate-shaped part 39. These first and second ribs 65, 67 and 67 constitute plate-shaped ribs of the present invention. The first rib 65 extends in the vehicle front-to-rear direction and substantially in parallel with the pillar trim body 31 and is joined at both side edges to the opposed side walls 35a and 35a of both the guide platforms 35 and 35. The upper ends of the front and rear side edges of the first rib 65 are continued to the guide surfaces 37 and 37 of both the guide platforms 35 and 35 and are substantially flush with (just flush with or slightly set back or forward from) the guide surfaces 37 and 37.

On the other hand, the two second ribs 67 and 67 extend in the vehicle width direction and orthogonally across the first rib 65 and are formed integrally with the first rib 65. The second ribs 67 and 67 are spaced apart from each other in the vehicle front-to-rear direction and their upper edges are substantially flush with (just flush with or slightly set back or forward from) the guide surfaces 37 and 37. The vehicle interior-side edges of the second ribs 67 and 67 are formed to substantially fully coincide with the contours of the front walls 35c and 35c of the guide platforms 35 and 35 when viewed from the vehicle front-to-rear direction. Therefore, the distance from the vehicle interior-side edges of the second ribs 67 and 67 to the pillar trim body 31 is substantially the same (just or almost the same) as the width of the groove 41 slong the vehicle width direction. Furthermore, the basal ends (lower ends) of parts of the second ribs 67 closer to the vehicle interior than the first rib 65 are formed integrally with the raised portion 39a. On the other hand, the vehicle exterior-side edges of parts of the second ribs 67 closer to the vehicle exterior than the first ribs 65 are inclined downward towards the vehicle exterior to gradually increase the distance from the first rib 65 (pillar trim body 31). A clearance is left between the basal ends (lower ends) of the parts of the second ribs 67 closer to the vehicle exterior than the first rib 65 and the insertion part 47 so as not to interfere with insertion of the lower end of the roof side rail 23 into between them.

Furthermore, the plate-shaped extension 55 formed integrally with the bottom surface of the plate-shaped part 39 extends downward in parallel with the first rib 65 to continue from the lower end of the first rib 65.

The rest of the configuration is the same as in Embodiment 1.

Effects of Embodiment 2

Also the B-pillar trim 13 for a motor vehicle according to Embodiment 2 can achieve the same effects as in Embodiment 1. In addition, Embodiment 2 can achieve the following particular effects.

Particularly, the basal ends of both the guide platforms 35 and 35 are joined to each other by the plate-shaped part 39 (connecting part) and the first and second ribs 65, 67 and 67 are formed between both the guide platforms 35 and 35. Therefore, the rigidities of the plate-shaped part 39 and the guide platforms 35 and 35 are increased, whereby the inflating airbag 27 can be firmly supported not only by the guide platforms 35 and 35 but also by the first and second ribs 65, 67 and 67.

Furthermore, the reaction force upon inflation of the airbag 27 is distributed to the guide platforms 35 and 35 and the first and second ribs 65, 67 and 67. Therefore, stress concentration on the guide platforms 35 and 35 can be reduced to prevent breakage of the guide platforms 35 and 35.

Furthermore, the upper edges of the first and second ribs 65, 67 and 67 are substantially flush with the guide surfaces 37 and 37 of the guide platforms 35 and 35. Therefore, upon inflation, the airbag 27 reaches the guide surfaces 37 and 37 of the guide platforms 35 and 35 and the upper edges of the first and second ribs 65, 67 and 67 substantially at the same time. Thus, the reaction force can be evenly distributed to the guide platforms 35 and 35 and the first and second ribs 65, 67 and 67 to prevent breakage of the guide platforms 35 and 35 with further stability and reliability.

Furthermore, the distance from the second ribs 67 and 67 to the pillar trim body 31 is substantially the same as the width of the groove 41 into which the lower end of the top sealing member 29 is to be inserted. Therefore, the top sealing member 29 can be smoothly inserted into the groove 41 without interfering with the second ribs 67 and 67.

Furthermore, a clearance corresponding to the thickness of the roof side rail 23 is left between the basal ends (lower ends) of the parts of the second ribs 67 closer to the vehicle exterior than the first rib 65 and the insertion part 47. Therefore, in inserting the insertion part 47 into the insertion opening 46, the second ribs 67 and 67 do not interfere with the lower end of the roof side rail 23, which is the upper end of the insertion opening 46, and the B-pillar trim 13 can be smoothly fitted to the vehicle body.

Other Embodiments

The above embodiments are merely preferred embodiments of the present invention. The present invention is not limited to the above embodiments and, for example, may have the following configurations.

In the above embodiments, a through hole 49 is formed to be surrounded by the portion of the plate-shaped part 39 (connecting part) located between both the guide platforms 35 and 35, portions of both the guide platforms 35 and 35 and the pillar trim body 31. However, the through hole 49 is sufficient if it is formed at least between the portion of the plate-shaped part 39 located between both the guide platforms 35 and 35 and the pillar trim body 31.

In the above embodiments, two guide platforms 35 and 35 are provided. However, the number of guide platforms 35 is not limited to two and may be three or more. In such cases, the basal ends of each adjacent guide platforms 35 and 35 are joined to each other by a portion of the plate-shaped part 39 serving as a connecting part.

In the above embodiments, the insertion opening 46 into which the insertion part 47 is to be inserted is formed at the boundary between the inner panel 21 and the roof side rail 23 separate from the inner panel 21. However, the inner panel 21 may be extended more upward and have an insertion opening 46 formed therein.

In the above embodiments, the second reinforcing rib 61 is formed integrally on the vehicle exterior-side surface of the extension 55 to join the insertion part 47 to the positioning pin 57. However, the second reinforcing rib 61 is sufficient if it is formed at least to join the bottom surface of a portion of the plate-shaped part 39 (connecting part) to the positioning pin 57.

Although in the above embodiments third reinforcing ribs 63 and 63 are provided to both sides of the second reinforcing rib 61, the third reinforcing ribs 63 are not necessarily provided.

In the above embodiments, the extension 55 is formed in the shape of a bridge by two side walls 56 and 56. However, the side walls 56 and 56 may be triangular ribs integrally formed with the extension 55 and the plate-shaped part 39. Alternatively, the front and rear edges of the extension 55 may be joined to the side parts 31b and 31b of the pillar trim body 31.

In Embodiment 2, the first rib 65 is formed to extend in the vehicle front-to-rear direction and the second ribs 67 and 67 are formed to extend in the vehicle width direction. However, the orientations of the first and second ribs 65, 67 and 67 are not limited to the above. Furthermore, although the first rib 65 is orthogonal to the second ribs 67 and 67, it is not necessarily orthogonal to the second ribs 67 and 67 and may be formed across them to form another angle with them. Furthermore, the number of first rib 65 can be one or more. Only the second ribs 67 and 67 may be formed on the plate-shaped part 39 without the first rib 65. On the contrary, only the first rib 65 may be formed on the plate-shaped part 39 without the second ribs 67 and 67.

Figure 10:
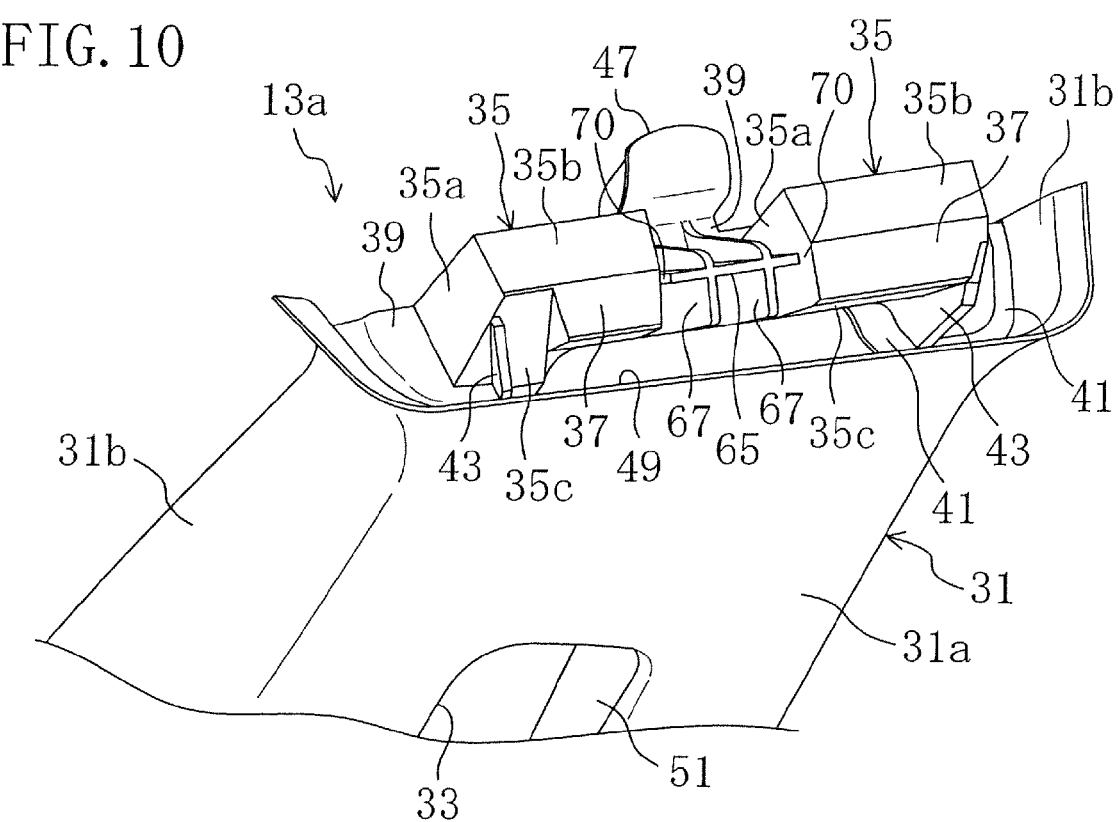
FIG. 10 is a corresponding view of FIG. 8, showing an embodiment in which a clearance is left between each of the side edges of a first rib in the vehicle front-to-rear direction and the guide platform adjacent to the side edge of the first rib.

In Embodiment 2, the side edges of the first rib 65 in the vehicle front-to-rear direction are integrally joined to the adjacent side walls 35a and 35a of the guide platforms 35 and 35. However, the side edges of the first rib 65 are not necessarily integrally joined to the adjacent side walls 35a and 35a and, as shown in FIG. 10, each side edge thereof may be formed to leave a slight clearance 70 from the adjacent side wall 35a.

The above embodiments show examples in which the present invention is applied to the B-pillar 3. However, the present invention can be applied also to the A-pillar trim 11 or the C-pillar trim 15.

What is claimed is:

1. A motor vehicle pillar trim fitted with an airbag that is placed on an interior side of a vehicle body towards a roof to extend in a front-to-rear direction of the vehicle body and covered with a top sealing member from an interior side of the vehicle, the pillar trim comprising:

a pillar trim body located below the airbag, connected at an upper end part thereof to a lower end of the top sealing member and covering a vehicle interior-side surface of a pillar of the vehicle body;

a plurality of guide platforms disposed at an upper end part of the pillar trim body at spaced intervals in the front-to-rear direction of the vehicle body to rise up beyond the upper end part of the pillar trim body and having respective guide surfaces for guiding an inflation of the airbag towards a vehicle interior; and a connecting part joining basal ends of each adjacent pair of the plurality of guide platforms to each other in the front-to-rear direction of the vehicle body, wherein a groove is formed between vehicle interior-side surfaces of the guide platforms and the upper end part of the pillar trim body to receive the lower end of the top sealing member, and a through hole is vertically formed at least between the connecting part and the pillar trim body to open into the groove.

2. The motor vehicle pillar trim of claim 1, wherein an insertion part is integrally formed with the connecting part between each adjacent pair of the plurality of guide platforms to extend towards a vehicle exterior from the connecting part and then rise up and configured to be insertable into an insertion opening formed in the pillar of the vehicle body.

3. A motor vehicle pillar trim fitted with an air bag that is placed on an interior side of a vehicle body towards a roof to extend in a front-to-rear direction of the vehicle body and covered with a top sealing member from an interior side of the vehicle, the pillar trim comprising:

a pillar trim body located below the airbag, connected at an upper end part thereof to a lower end of the top sealing member and covering a vehicle interior-side surface of a pillar of the vehicle body;

a plurality of guide platforms disposed at an upper end part of the pillar trim body at spaced intervals in the front-to-rear direction of the vehicle body to rise up beyond the upper end of the pillar trim body and having respective guide surfaces for guiding an inflation of the airbag towards a vehicle interior;

a plate-shaped connecting part joining basal ends of each adjacent pair of the plurality of guide platforms to each other in the front-to-rear direction of the vehicle body;

an insertion part rising up from a vehicle exterior side of the connecting part and insertable into an insertion opening formed in the pillar of the vehicle body;

an extension extending downward from the connecting part while being spaced apart from the pillar trim body towards a vehicle exterior;

a positioning pin raised from a distal end of the extension towards the vehicle exterior and fittable into a positioning hole formed in the pillar; and a reinforcing rib integrally formed on a vehicle exterior-side surface of the extension to join the bottom surface of the connecting part to the positioning pin.

4. The motor vehicle pillar trim of claim 3, wherein the extension has integral side walls formed on both sides in the front-to-rear direction of the vehicle body to join the extension to the pillar trim body and thereby has a general shape of a bridge.

5. A motor vehicle pillar trim fitted with an air bag that is placed on an interior side of a vehicle body towards a roof to extend in a front-to-rear direction of the vehicle body and covered with a top sealing member from an interior side of the vehicle, the pillar trim comprising:

a pillar trim body located below the airbag, connected at an upper part thereof to a lower end of the top sealing member and covering a vehicle interior-side surface of a pillar of the vehicle body;

a plurality of guide platforms disposed at an upper part of the pillar trim body in the front-to-rear direction of the vehicle body to rise up beyond the upper part of the pillar trim body and having respective guide surfaces for guiding an inflation of the airbag towards a vehicle interior; and a connecting part joining basal ends of each adjacent pair of the plurality of guide platforms to each other in the front-to-rear direction of the vehicle body, wherein a groove is formed between vehicle interior-side surfaces of the guide platforms and an upper end part of the pillar trim body to receive a lower end of the top sealing member, and a rib is integrally raised from the connecting part between each adjacent pair of the plurality of guide platforms, an upper edge of the rib being substantially flush with the guide platforms, a distance between the rib and an upper end part of the pillar trim body being substantially a same as a width of the groove along the vehicle width direction, wherein the rib comprises at least one of a first rib having two side edges extending substantially in the front-to-rear direction of the vehicle body and a second rib extending substantially in the vehicle width direction, and wherein the two side edges of the first rib in the front-to-rear direction of the vehicle body are integrally joined to the adjacent guide platforms.

6. A motor vehicle pillar trim fitted with an air bag that is placed on an interior side of a vehicle body towards a roof to extend in a front-to-rear direction of the vehicle body and covered with a top sealing member from an interior side of the vehicle, the pillar trim comprising:

a pillar trim body located below the airbag, connected at an upper part thereof to a lower end of the top sealing member and covering a vehicle interior-side surface of a pillar of the vehicle body;

a plurality of guide platforms disposed at an upper part of the pillar trim body at spaced intervals in the front-to-rear direction of the vehicle body to rise up beyond the upper part of the pillar trim body and having respective guide surfaces for guiding an inflation of the airbag towards a vehicle interior; and a connecting part joining basal ends of each adjacent pair of the plurality of guide platforms to each other in the front-to-rear direction of the vehicle body, wherein a groove is formed between vehicle interior-side surfaces of the guide platforms and an upper end part of the pillar trim body to receive a lower end of the top sealing member, a rib is integrally raised from the connecting part between each adjacent pair of the plurality of guide platforms, an upper edge of the rib being substantially flush with the guide platforms, a distance between the rib and an upper end part of the pillar trim body being substantially a same as a width of the groove along the vehicle width direction, and an insertion part rising up from a vehicle exterior side of the connecting part and insertable into an insertion opening formed in the pillar of the vehicle body, wherein a clearance at least corresponding to the thickness of the peripheral edge of the insertion opening in the pillar is left between the insertion part and the rib.

7. A motor vehicle pillar trim fitted with an air bag that is placed on an interior side of a vehicle body towards a roof to extend in a front-to-rear direction of the vehicle body and covered with a top sealing member from an interior side of the vehicle, the pillar trim comprising:

a pillar trim body located below the airbag, connected at an upper part thereof to a lower end of the top sealing member and covering a vehicle interior-side surface of a pillar of the vehicle body;

a plurality of guide platforms disposed at an upper part of the pillar trim body at spaced intervals in the front-to-rear direction of the vehicle body to rise up beyond the upper part of the pillar trim body and having respective guide surfaces for guiding an inflation of the airbag towards a vehicle interior; and a connecting part joining basal ends of each adjacent pair of the plurality of guide platforms to each other in the front-to-rear direction of the vehicle body, wherein a groove is formed between vehicle interior-side surfaces of the guide platforms and an upper end part of the pillar trim body to receive a lower end of the top sealing member, and a rib is integrally raised from the connecting part between each adjacent pair of the plurality of guide platforms, an upper edge of the rib being substantially flush with the guide platforms, a distance between the rib and an upper end part of the pillar trim body being substantially a same as a width of the groove along the vehicle width direction, wherein the rib comprises at least one of a first rib having two side edges extending substantially in the front-to-rear direction of the vehicle body and a second rib extending substantially in the vehicle width direction, an insertion part rising up from a vehicle exterior side of the connecting part and insertable into an insertion opening formed in the pillar of the vehicle body, wherein a clearance at least corresponding to the thickness of the peripheral edge of the insertion opening in the pillar is left between the insertion part and the rib.

* * * * *

UNITED STATES PATENT AND TRADEMARK OFFICE
CERTIFICATE OF CORRECTION

PATENT NO. : 7,963,551 B2
APPLICATION NO. : 12/129721
DATED : June 21, 2011
INVENTOR(S) : Daisuke Matsuoka and Ikuko Onishi It is certified that error appears in the above-identified patent and that said Letters Patent is hereby corrected as shown below:

On the Title Page item (73), should read;

(73) Assignees: DAIKYONISHIKAWA CORPORATION (JP)
MAZDA MOTOR CORPORATION (JP)

Signed and Sealed this
Twenty-seventh Day of March, 2012

David J. Kappos
*Director of the United States Patent and Trademark Office*